(12) United States Patent
Mueller et al.

(10) Patent No.: US 8,899,303 B2
(45) Date of Patent: Dec. 2, 2014

(54) CERAMIC CORE WITH COMPOSITE INSERT FOR CASTING AIRFOILS

(75) Inventors: Boyd Mueller, Whitehall, MI (US); Darren Rogers, Muskegon, MI (US); Timothy J. Molamphy, Morristown, TN (US)

(73) Assignee: Howmet Corporation, Whitehall, MI (US)

( * ) Notice: Subject to any disclaimer, the term of this patent is extended or adjusted under 35 U.S.C. 154(b) by 0 days.

(21) Appl. No.: 13/068,413

(22) Filed: May 10, 2011

(65) Prior Publication Data

US 2012/0285648 A1 Nov. 15, 2012

(51) Int. Cl.
*B22C 9/10* (2006.01)
*B29C 33/40* (2006.01)
*B22C 7/06* (2006.01)
*B28B 7/34* (2006.01)
*B29C 45/00* (2006.01)
*B29C 33/38* (2006.01)
*B22C 9/04* (2006.01)
*B29C 45/14* (2006.01)
*B22C 7/02* (2006.01)

(52) U.S. Cl.
CPC ............. *B28B 7/342* (2013.01); *F05B 2230/21* (2013.01); *B29C 2045/1477* (2013.01); *B29C 33/40* (2013.01); *B22C 7/06* (2013.01); *B22C 9/10* (2013.01); *B29C 45/14467* (2013.01); *B22C 7/026* (2013.01); *B29C 45/0013* (2013.01); *B29C 33/3807* (2013.01); *B22C 7/02* (2013.01); *B22C 9/04* (2013.01)
USPC ............................................. 164/369; 164/34

(58) Field of Classification Search
CPC .............. B22C 7/02; B22C 7/06; B22C 9/04; B22C 9/10; B28B 7/342
USPC ......... 164/28, 34–36, 137, 361, 369, 370, 516
See application file for complete search history.

(56) References Cited

U.S. PATENT DOCUMENTS

| | | | |
|---|---|---|---|
| 4,044,815 A | 8/1977 | Smashey et al. | 164/35 |
| 4,384,607 A | 5/1983 | Wood et al. | 164/132 |
| 4,421,153 A | 12/1983 | Wilkinson et al. | 164/35 |
| 4,427,742 A | 1/1984 | Willgoose et al. | 428/338 |
| 4,434,835 A | 3/1984 | Willgoose | 164/34 |
| 4,722,762 A | 2/1988 | Luhleich et al. | 156/305 |
| 4,728,258 A | 3/1988 | Blazek et al. | 415/137 |
| 5,038,014 A | 8/1991 | Pratt et al. | 219/121.64 |
| 5,295,530 A | 3/1994 | O'Connor et al. | 164/516 |
| 5,339,888 A | 8/1994 | Tanner, Jr. | 164/516 |
| 5,350,002 A | 9/1994 | Orton | 164/24 |

(Continued)

FOREIGN PATENT DOCUMENTS

JP 55165264 12/1980

*Primary Examiner* — Kevin E Yoon

(57) ABSTRACT

A multi-wall ceramic core for casting an airfoil with one or more internal cooling passages is made by preforming at least one fugitive core insert, then forming at least one core insert in-situ adjacent and fused to the at least one preformed core insert by introducing fluid fugitive pattern material into a composite core insert mold whereby the fugitive core inserts are integrally connected as a single composite core insert that includes features to form internal passage surfaces in the core when the composite core insert is removed. The composite core insert is placed in a core molding die cavity, and a fluid ceramic material is introduced into the die cavity to form the ceramic core body incorporating the fugitive composite core insert therein.

12 Claims, 9 Drawing Sheets

(56) References Cited

U.S. PATENT DOCUMENTS

| | | | |
|---|---|---|---|
| 5,498,132 A | 3/1996 | Carozza et al. | 416/97 R |
| 5,503,218 A | 4/1996 | Campion et al. | 164/516 |
| 5,545,003 A | 8/1996 | O'Connor et al. | 415/115 |
| 5,820,774 A | 10/1998 | Dietrich | 249/61 |
| 5,921,309 A | 7/1999 | Nishida et al. | 164/35 |
| 6,068,806 A | 5/2000 | Dietrich | 264/219 |
| 6,347,660 B1 | 2/2002 | Sikkenga et al. | 164/137 |
| 6,502,801 B2 | 1/2003 | Lee et al. | 249/79 |
| 6,626,230 B1 | 9/2003 | Woodrum et al. | 164/516 |
| 7,246,653 B2 * | 7/2007 | Judet | 164/516 |
| 7,270,166 B2 | 9/2007 | Jakus et al. | 164/45 |
| 7,296,615 B2 * | 11/2007 | Devine et al. | 164/516 |
| 7,302,989 B1 | 12/2007 | Kamel et al. | 164/15 |
| 7,306,026 B2 * | 12/2007 | Memmen | 164/516 |
| 7,351,364 B2 | 4/2008 | Morrison et al. | 264/162 |
| 7,413,001 B2 | 8/2008 | Wang et al. | 164/516 |
| 7,720,166 B2 | 5/2010 | Lomnitz et al. | 375/262 |
| 2005/0156361 A1 | 7/2005 | Holowczak et al. | 264/603 |
| 2005/0258577 A1 | 11/2005 | Holowczak et al. | 264/600 |
| 2007/0175009 A1 | 8/2007 | Alaux et al. | 29/225 |
| 2008/0135202 A1 * | 6/2008 | Lee et al. | 164/28 |
| 2008/0169076 A1 | 7/2008 | Aprile et al. | 165/15 |
| 2009/0060714 A1 | 3/2009 | Moors | 415/115 |
| 2009/0235525 A1 | 9/2009 | Arrell et al. | 29/889.2 |

* cited by examiner

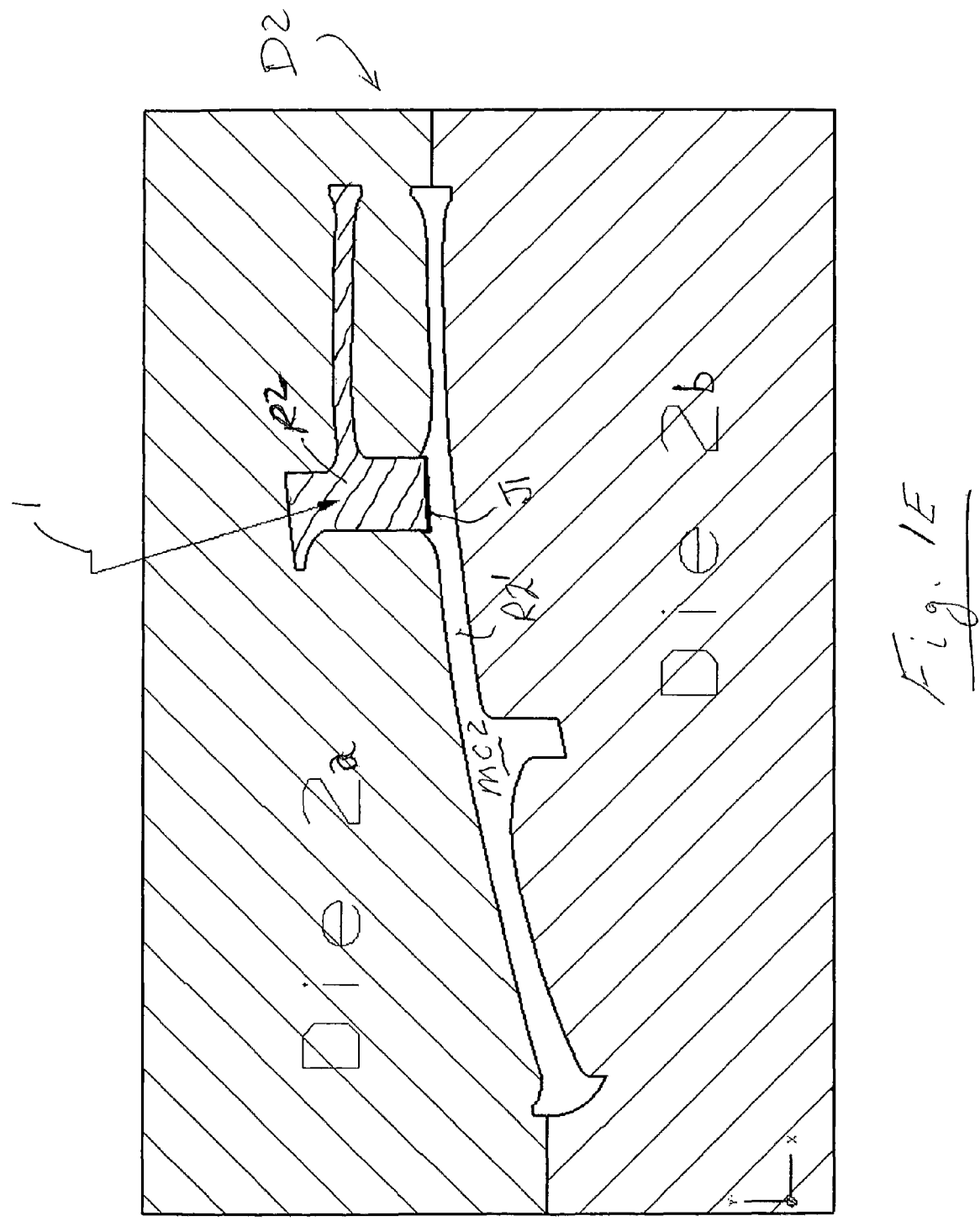

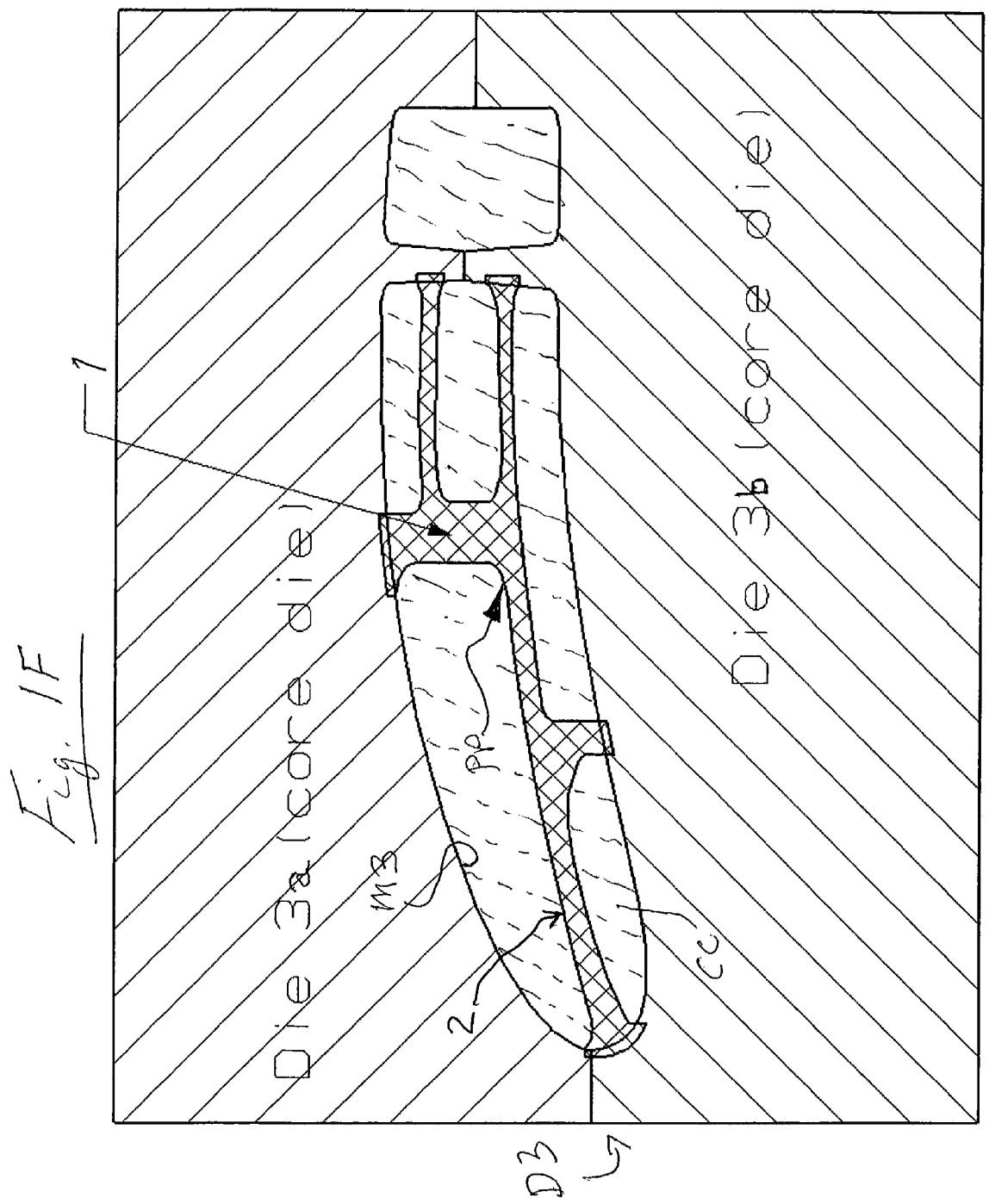

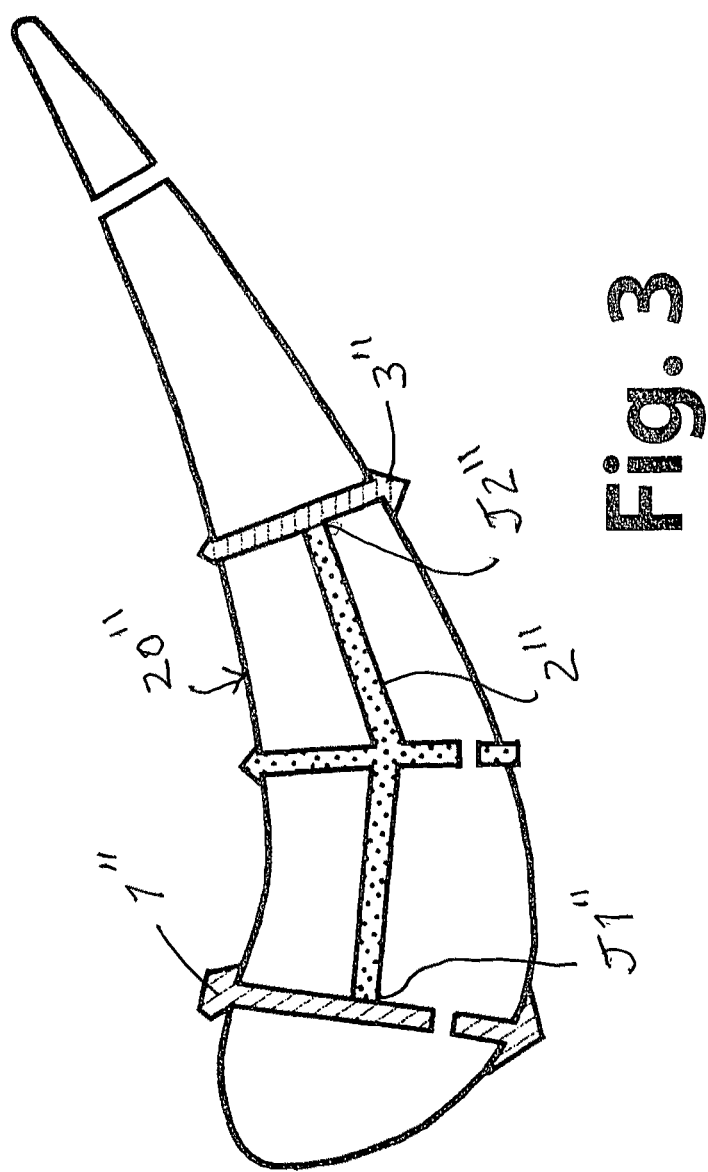

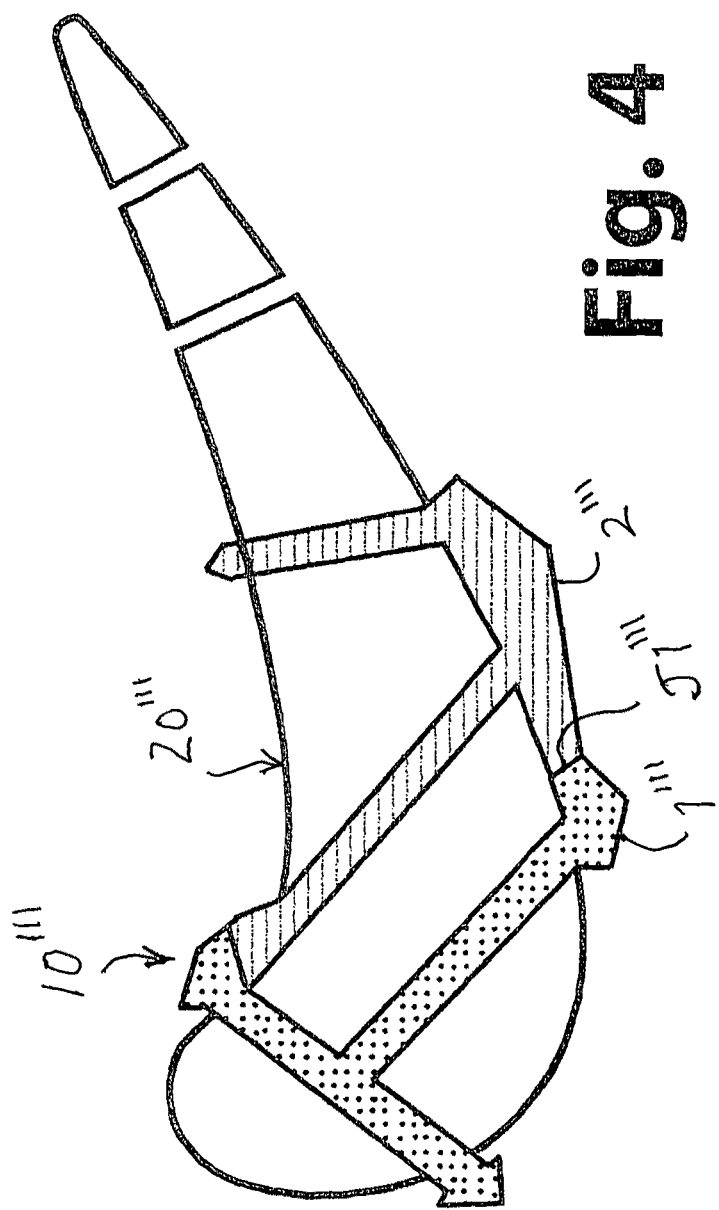

CERAMIC CORE WITH COMPOSITE INSERT FOR CASTING AIRFOILS

FIELD OF THE INVENTION

The present invention relates to complex ceramic cores for casting multi-wall airfoil castings, such as airfoils having multiple cast walls and complex passages for improved air cooling efficiency, and to a method of making such complex multi-wall ceramic cores.

BACKGROUND OF THE INVENTION

Most manufacturers of gas turbine engines are evaluating advanced multi-wall, thin-wall turbine airfoils (i.e. turbine blade or vane) which include intricate air cooling channels to improve efficiency of airfoil internal cooling to permit greater engine thrust and provide satisfactory airfoil service life. However, cooling schemes for advanced high-thrust aircraft engines are complex, often involving multiple, thin walls and non-planar cooling features. The ceramic cores that define these advanced cooling schemes are conventionally formed by forcing ceramic compound into steel tooling, but core complexity is limited by the capabilities of tooling design/fabrication. Therefore, complex advanced cooling schemes often rely on the assembly of multiple ceramic core pieces after firing. Assembly requires specialized labor and results in core dimensional variability due to mismatch between assembled core components, while the fragile nature of fired cores results in elevated handling scrap, and compromises to the advanced cooling schemes are required to allow for assembly.

Some core geometries require the formation of multiple fugitive core inserts to define features that do not operate in common planes, including: (1) multiple skin core segments, (2) trailing edge features (e.g., pedestals and exits), (3) leading edge features (e.g., cross-overs), and (4) features that curve over the length of the airfoil. Forming multiple fugitive inserts and assembling them in a core die presents a similar problem to that created by core assembly. Intimate contact between inserts may not be insured when they are loaded into a core die, either due to dimensional variability in the individual inserts or poor locating schemes in the core die. Subsequent molding of the ceramic core material may result in formation of flash at the union of two fugitive insert segments. While flash is common in ceramic core molding and is removed as part of standard processing, flash around or between fugitive inserts may reside in hidden, internal cavities or as part of intricate features, where inspection and removal is not possible. Any such flash remaining in the fired ceramic core can alter air flow in the cast blade or vane.

U.S. Pat. Nos. 5,295,530 and 5,545,003 describe advanced multi-walled, thin-walled turbine blade or vane designs which include intricate air cooling channels to this end.

In U.S. Pat. No. 5,295,530, a multi-wall core assembly is made by coating a first thin wall ceramic core with wax or plastic, a second similar ceramic core is positioned on the first coated ceramic core using temporary locating pins, holes are drilled through the ceramic cores, a locating rod is inserted into each drilled hole and then the second core then is coated with wax or plastic. This sequence is repeated as necessary to build up the multi-wall ceramic core assembly.

This core assembly procedure is quite complex, time consuming and costly as a result of use of the multiple connecting and other rods and drilled holes in the cores to receive the rods. in addition, this core assembly procedure can result in a loss of dimensional accuracy and repeatability of the core assemblies and thus airfoil castings produced using such core assemblies.

U.S. Pat. No. 6,626,230 describes describes forming multiple fugitive (e.g. wax) thin wall pattern elements as one piece or as indivdual elements that are joined together by adhesive to form a pattern assembly that is placed in a ceramic core die for molding a one-piece core.

SUMMARY OF THE INVENTION

The present invention provides a method of making a multi-wall ceramic core for use in casting advanced multi-wall, thin-wall turbine airfoils (e.g. turbine blade or vane castings) which can include complex air cooling channels to improve efficiency of airfoil internal cooling.

The present invention provides in an embodiment a method of making such a multi-wall ceramic core wherein a composite core insert is formed in a series of steps by preforming at least one fugitive core insert and then forming at least one fugitive core insert in-situ adjacent and integrally connected to the preformed core insert. The composite core insert includes features to form internal surfaces in the core when the composite core insert is subsequently selectively removed.

The composite core insert is placed in a core molding die cavity and a fluid ceramic material is introduced into the die cavity to form a core body around the composite core insert. The core body is removed from the die cavity followed by firing, which can include selective removal of the composite core insert from the core body, to yield a fired multi-wall ceramic core on which a fugitive pattern of airfoil to be cast can be formed for investment in a ceramic shell mold by the lost wax process.

In a further illustrative embodiment of the invention, one of the fugitive core inserts forms a cross-over passage in the ceramic core proximate its leading and/or trailing edge when the composite core insert is removed.

In still a further illustrative embodiment of the invention, one of the core inserts forms a pressure-side and/or suction-side skin core segment surface in the ceramic core when the composite core insert is removed.

In still an additional illustrative embodiment of the invention, one of the core inserts forms a trailing edge surface (pedestal and/or exit) on the ceramic core when the composite core insert is removed.

Practice of the present invention is advantageous in that it eiminates loose fit between manually assembled core insert components, reduces the mislocation of insert components in the core die during subsequent core molding, avoids use of adhesives or other dissimilar material that may fail at temperatures and pressures involved during subsequent core molding processes or retard/affect fugitive insert removal, eliminates core flash formed between the integrally-joined fugitive inserts, and as a result provides improved internal wall and feature position control and reduces the criticality of inspection and repair of internal features. Practice of the present inention facilitates manufacture of complex cores with internal walls that cannot readily be inspected or repaired once the core is formed, since positive location of core inserts and elimination of core flash at core joints are embodied in the present invention.

Other advantages of the present invention will become more readily apparent from the following detailed description taken with the following drawings.

BRIEF DESCRIPTION OF THE DRAWINGS

FIG. 1E illustrates a second composite core die in which the preformed fugitive core insert formed in the die of FIG. 1D is received and the second fugitive core insert is overmolded onto the preformed core insert to form a composite fugitive core insert pursuant to an illustrative embodiment of the invention.

FIG. 1F shows the composite fugitive core insert formed and residing in a core die to form a ceramic core around the fugitive core insert.

FIG. 3 is a sectional view of a ceramic core having a composite core insert having three core inserts fused together pursuant to still another embodiment of the invention.

FIG. 4 is a sectional view of a ceramic core having a composite core insert with two fused core inserts therein pursuant to a further embodiment of the invention.

DESCRIPTION OF THE INVENTION

In order to make aircraft engine airfoil cooling schemes most effective, especially high pressure turbine blade and vanes (hereafter airfoils), the internal passages of these components need to reinforce the airfoil walls and also precisely partition the internal cooling air such that its pressure is controlled and it is directed to the most needed areas of the blade or vane. Practice of the present invention using a fugitve composite core inserts with core inserts fused to one another permits production of complex airfoil core geometries, which cannot be pulled in a single or multiplane tool. The present invention allows for the creation of additional and specifically more complex airfol core geometries and eliminates parting or witness lines between individual fugitive core inserts and ties them together into a single fugitive composite core insert for insertion into the core die for injection.

Embodiment 1

Figure 1A:
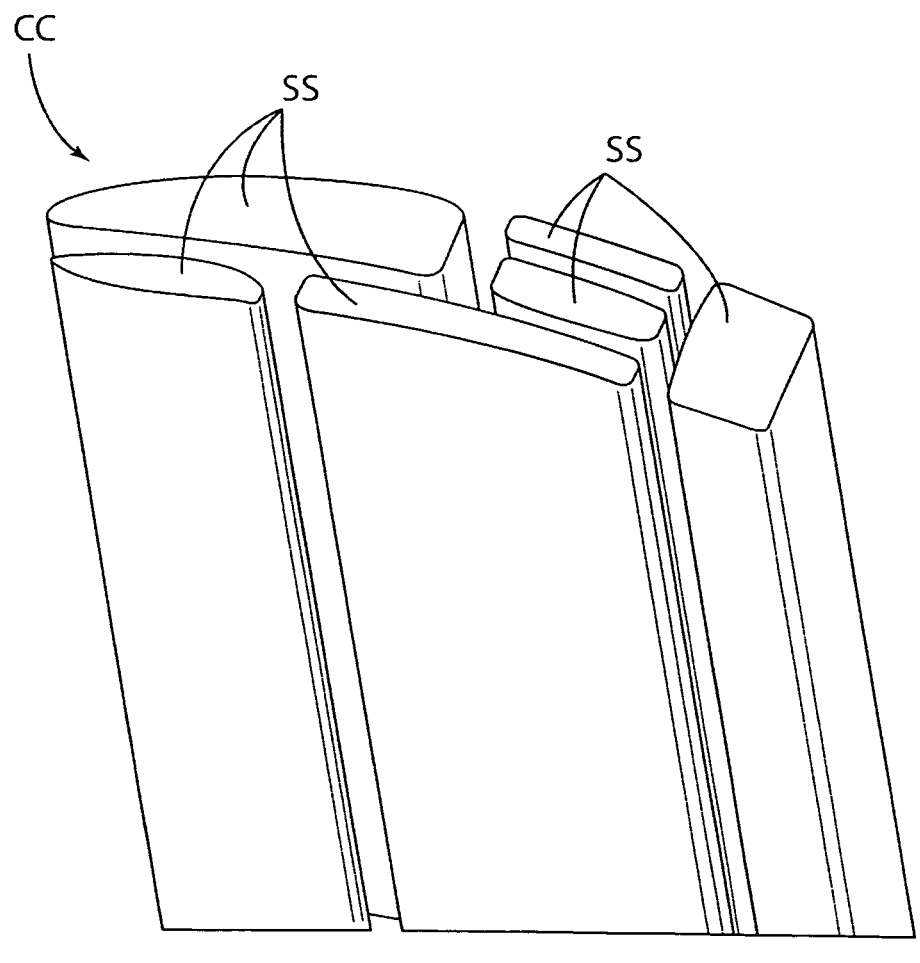
FIG. 1A is a partial perspective view of a ceramic core needed to cast an advanced cooling scheme for a turbine blade or vane.

As a preface to describing this embodiment of the invention, FIG. 1A shows a portion of a ceramic core CC needed for the advanced cooling scheme for forming a cooling passage scheme in a turbine blade or vane. This core CC includes solid sections SS that are interconnected at locations hidden from view in FIG. 1A and that will form the cooling passages when molten metal or alloy is cast and solidified around the core CC and the core then is selectively removed. This type of a cooling scheme would be extremely difficult or impossible to form by assemblying multiple individual ceramic core pieces to a ceramic core for casting.

Figure 1B:
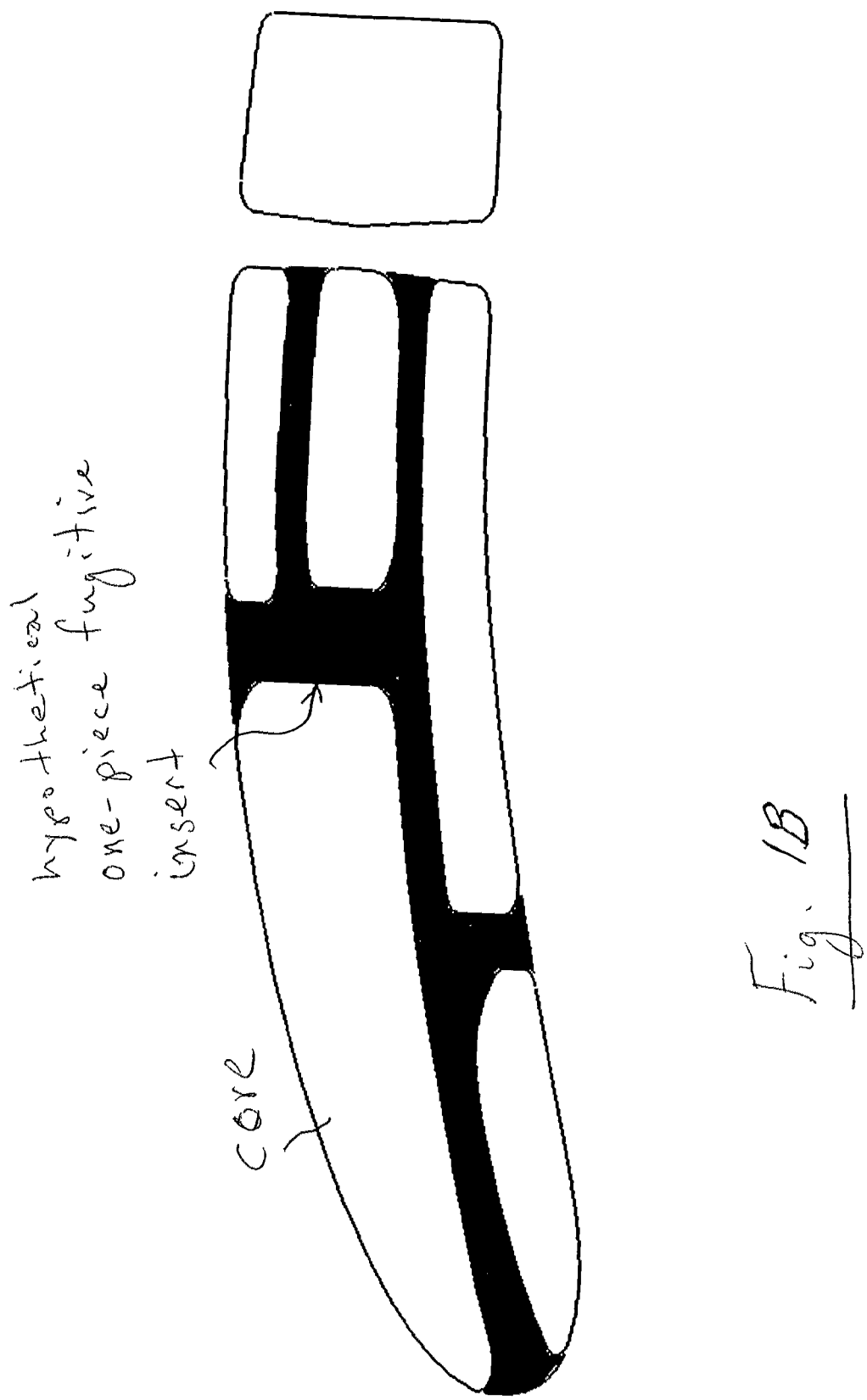
FIG. 1B is a sectional view of a hypothetical one-piece fugitive core insert needed to form the core of FIG. 1A but which cannot be formed in a single injection process.

FIG. 1B shows a sectional view of a hypothetical one-piece fugitive core insert needed to form the ceramic core CC of FIG. 1A, but which fugitive core insert cannot be formed as a one-piece core insert in a single injection process due to features which occlude tooling pull planes.

Figure 1C:
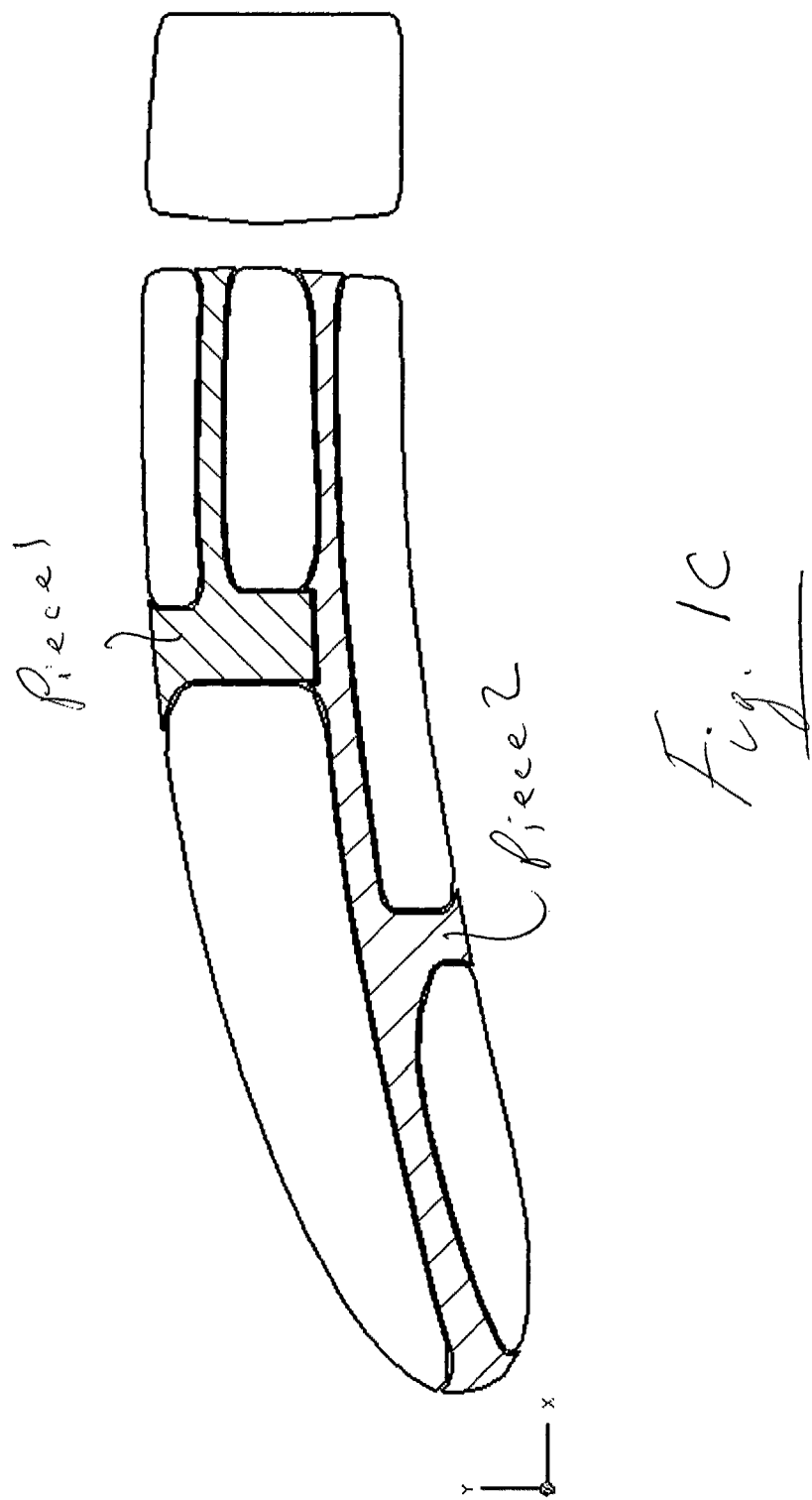
FIG. 1C illustrates how the fugitive core insert of FIG. 1B can be made by manually assembling two separate insert pieces but with drawbacks that render this approach unsuitable for advanced cooling schemes such as shown in FIG. 1A where it is impossible for thin flash to be removed since these is no access to the hidden internal features of this core.

Although the fugitive core insert of FIG. 1B could be formed as two separate pieces and assembled, as shown in FIG. 1C, this approach has numerous drawbacks that include, but are limited to, difficulty of assembly of small fugitive (e.g. wax) insert pieces (Pieces 1 and 2), the joining of the two fugitive inserts to form a strong, accurate joint, and the propensity for flash to form at the joint between the two fugitive insert pieces. Advanced cooling schemes such as shown in FIG. 1A make it impossible for this flash to be removed since these is no access to the hidden internal features of this core. Therefore, the thin flash must be prevented.

Figure 1D:
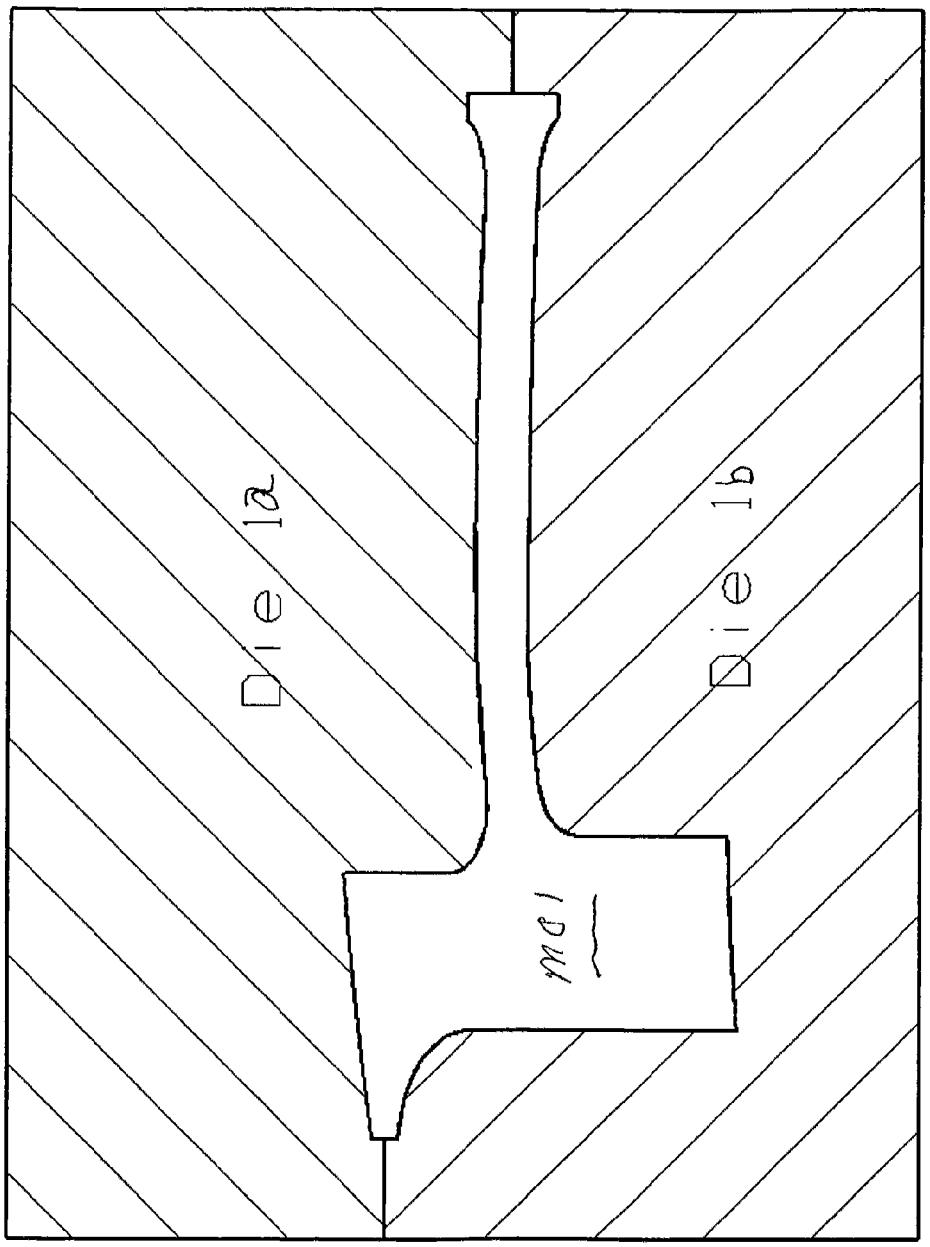
FIG. 1D illustrates a core insert die for making the preformed fugitive core insert in FIG. 1C pursuant to an illustrative embodiment of the invention.

Referring to FIGS. 1D through 1F, an illustrative embodiment of the invention will be described for purposes of illustration and not limitation to form the ceramic core CC of FIG. 1A while overcoming the above-enumerated drawbacks.

FIG. 1D illustrates a core insert die D1 having first and second die mating die sections 1a, 1b that form a molding cavity MC1 for making a preformed fugitive core insert 1 shown in FIG. 1E pursuant to a step of an illustrative method embodiment of the invention. Fluid fugitive pattern material, such as molten wax or plastic or other material, is injected or otherwise introduced into the molding cavity MC1 to form the preformed fugitive core insert 1 when the wax solidifies and is removed from the die D1.

FIG. 1E illustrates a second composite core die D2. The die D2 has first and second die mating die sections 2a, 2b that form a molding cavity MC2 for making a composite fugitive insert PP pursuant to an illustrative embodiment of the invention, FIG. 1F. In particular, the molding cavity MC2 includes a region R2 configured to receive the preformed fugitive core insert 1 as shown in FIG. 1D and an initially empty region R2' configured to form the remainder of the composite fugitive insert PP and adapted to receive fluid fugitive pattern material, such as molten wax, to this end to form or over-mold the remaining fugitive core insert 2 onto the preformed fugitive insert 1 at joint J1 to form the composite fugitive core insert of FIG. 1F. Formation of the remaining fugitive insert 2 by such in-situ over-molding onto the preformed fugitive insert 1 in die D2 provides a strong, consistent and accurate bond at joint J1 without any possibility of flash at the joint because the over-molded fugitive material provides a tight seal to the fugitive insert.

FIG. 1F shows the composite fugitive core insert PP after the molten wax solidifies and after removal from die D2. The fugitive core insert PP includes the preformed insert 1 and the in-situ formed insert 2 over-molded on preformed insert 1 at the joint J1 to form composite one-piece fugitive insert PP.

The composite fugitive insert PP from die D2 is then placed in a final ceramic core die D3 having sections 3a, 3b forming a molding cavity M3. Fluid ceramic core material, such as molten thermoplastic or wax binder containing the core ceramic particles of alumina, silica, zirconia, or other suitable ceramic or mixtures thereof, is injected or otherwise introduced into the molding cavity M3 in and around the insert PP to form a single piece green (unfired) ceramic core CC. The fugitive insert PP is then selectively removed by conventional thermal or other means from the green core CC removed from die D3. The green core CC then is fired at elevated temperature to form a fired ceramic core CC, FIG. 1A, for use in making a ceramic mold for casting a turbine blade or vane as described in more detail below in Embodiment 2.

Figure 2:
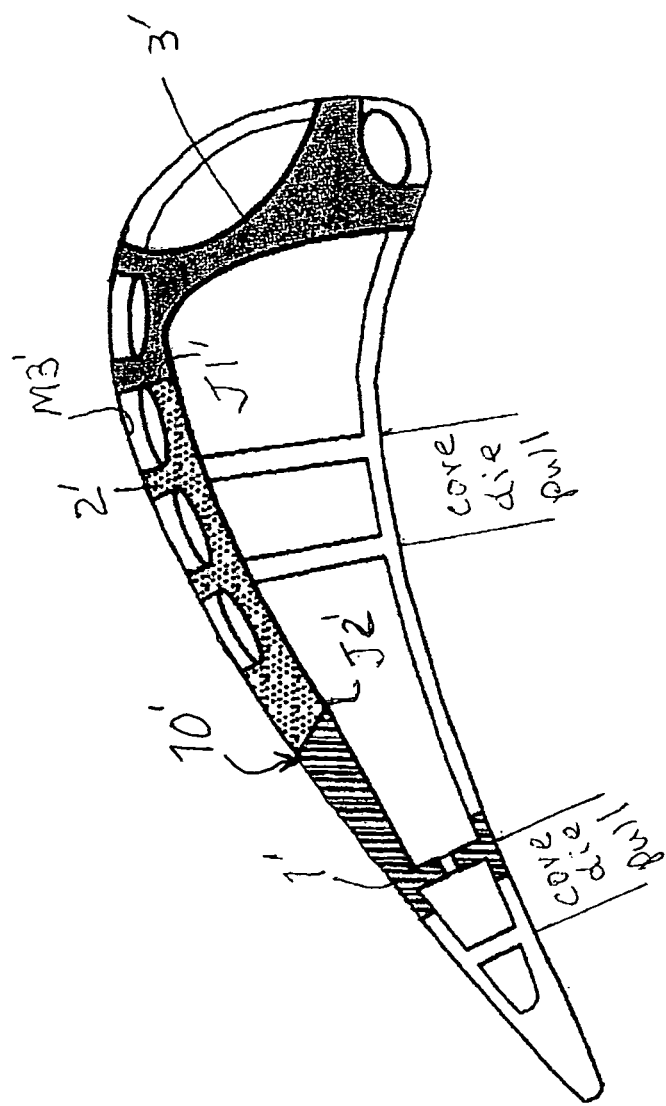
FIG. 2 is a sectional view of a composite core insert having three core inserts fused together pursuant to another illustrative embodiment of the invention.

For purposes of further illustration and not limitation, FIGS. 2, 3, and 4 schematically illustrate three different additional embodiments of the invention in which composite fugitive insert offers the above-described advantages.

Embodiment 2

In FIG. 2, preformed fugitive core insert 1' forms trailing edge and dual row of cross-over passage features of the core, in-situ formed fugitive core insert 2' forms skin core segments that cannot be formed by core tooling, and preformed fugitive core insert 3' forms a leading edge passage.

Preformed fugitive core inserts 1' and 3' are formed separately which allows use of simpler tooling to form them as a result. For example, preformed insert 1' can be formed in a core insert mold having a suitably configured mold cavity. A fugitve material such as molten wax or plastic material can be injected into the insert mold to form the insert 1'. Similarly, preformed insert 3' can be formed in another core insert mold having a suitably configured mold cavity for that insert. A fugitve material such as molten wax or plastic material can be injected into that insert mold to form the insert 3'.

In-situ formed insert 2' is formed in-situ between the preformed inserts 1' and 3' in a composite insert mold in which the preformed inserts 1' and 3' are placed so as to reside on opposite sides of an intermediate mold cavity for forming the insert 2'. A fugitive material such as molten wax or plastic material can be injected into the intermediate mold cavity to form the insert 2' in-situ between and integrally connected to preformed inserts 1' and 3' when the molten wax or plastic material solidifies so as to create an integral, union or joint J2' between insert 1' and 2' and union or joint J1' between insert 2' and 3' by fusing them together. Typically, the molten wax or plastic material is overmolded, in that an initial fugitive inserts 1' and 3' are loaded into a die and the fugitive material is injected into the cavity filling the void between inserts 1' and 3' and joining them together to form a single, complex fugitive insert 10' for loading into the core die. The method eliminates adhesive and its potentially deleterious effect on insert removal, while insuring accurate fit-up and elimination of core flash during core molding.

In production of a ceramic core for casting a superalloy airfoil, such as a gas turbine engine airfoil (blade or vane), the composite core insert formed by united inserts 1', 2', 3' typically will have a general airfoil cross-sectional profile with concave and convex sides and leading and trailing edges complementary to the airfoil to be cast as those skilled in the art will appreciate.

The composite fugitive core insert comprised of preformed insert 1', in-situ formed insert 2', and preformed insert 3' integrally connected is placed in a core die cavity M3' shown schematically, FIG. 2. Two core die pulls are illustrated and employed to form trailing edge features and main body ribs of the ceramic core. A fluid ceramic material, such as a thermoplastic or wax binder containing the core ceramic particles of alumina, silica, zirconia, or other suitable ceramic or mixtures thereof, is introduced into the core die cavity to form the ceramic core body incorporating the composite core insert therein after the fluid ceramic material solidifies, sets, gells and/or hardens in the die cavity. The invention is not limited to forming the ceramic core by injection of ceramic material and also can be practiced using poured core molding, slip-cast molding transfer molding, or other core-forming techniques.

The ceramic core material can comprise silica based, alumina based, zircon based, zirconia based, or other suitable core ceramic materials and mixtures thereof known to those skilled in the art. The particular ceramic core material forms no part of the invention, suitable ceramic core materials being described in U.S. Pat. No. 5,394,932. The core material is chosen to be chemically leachable from the airfoil casting formed thereabout as is known.

Thereafter, the green (unfired) ceramic core with the composite core insert therein is removed from the core mold die cavity and fired (sintered) to render it suitable for use in casting of a molten metal or alloy. The fugitive composite core insert 10' can be selectively removed from the core before or as part of the firing operation. Typically, the fired ceramic core will be subjected to conventional lost wax investment casting steps that involve forming a fugitive pattern of the airfoil to be cast on the core with pattern material filling passages present in the core, investing the core/pattern in a ceramic shell mold followed by a pattern removal operation to selectively remove the fugitive pattern of the airfoil to be cast. This leaves a ceramic shell mold that is fired and then cast with molten metal or alloy. For example, the ceramic core is invested in ceramic mold material pursuant to the well known "lost wax" process by repeated dipping in ceramic slurry, draining excess slurry, and stuccoing with coarse grain ceramic stucco until a shell mold is built-up on the core/pattern assembly to a desired thickness. The shell mold then is fired at elevated temperature to develop mold strength for casting, and the pattern is selectively removed by thermal or chemical dissolution techniques, leaving the shell mold having the core assembly therein. Molten superalloy then is introduced into the shell mold with the ceramic core therein using conventional casting techniques. The molten superalloy can be directionally solidified in the mold about the core to form a columnar grain or single crystal airfoil casting. Alternately, the molten superalloy can be solidified to produce an equi-axed grain airfoil casting. The casting mold is removed from the solidified casting using a mechanical knock-out operation followed by one or more known chemical leaching or mechanical grit blasting techniques. The core is selectively removed from the solidified airfoil casting by chemical leaching or other conventional core removal techniques.

Embodiment 3

FIG. 3 illustates a ceramic core 20" pursuant to an embodiment of the invention, in which internal features cannot be examined or repaired. In this embodiment, core inserts 1" and 3" are preformed and then fused with in-situ formed core insert 2" at unnions or joints J1" and J2" during its formation as described above without core flash to form the composite fugitive core insert 10". The composite core insert is then placed in a core die cavity to mold the core body around the composite core insert as described above. Core inserts 2" and 3" have elongated sections that lie in different planes as shown.

Embodiment 4

FIG. 4 illustates a ceramic core 20''' pursuant to an embodiment of the invention having two core inserts; namely preformed core insert 1''' and in-situ formed core insert 2' wherein the inserts 1' and 2''' are fused together at union or joint J1' during formation of insert 2''' as described above so as to eliminate core flash and improve accuracy of insert location.

Practice of the present invention using fugitive core inserts as described above permits production of complex core geometries which cannot be pulled in a single or multiplane tool. The present invention allows for the creation of additional and specifically more complex geometries and eliminates parting or witness lines between manually assembled individual fugitive pieces and ties them together into a single composite fugitive insert for insertion into the core die for injection.

Moreover, the present invention can produce core geometries that require core features that do not operate in common planes, including: (1) multiple skin core segments, (2) trailing edge features (e.g., pedestals and exits), (3) leading edge features (e.g., cross-overs), and (4) features that curve over the length of the airfoil.

While one or two preformed fugitive inserts were over molded in the above examples, in practice of the invention any number of preformed inserts could be overmolded to for the composite fugitive insert.

It will be apparent to those skilled in the art that various modifications and variations can be made in the embodiments of the present invention described above without departing from the spirit and scope of the invention as set forth in the appended claims.

We claim:

1. Combination of a multi-wall molded ceramic core for casting a hollow airfoil and a fugitive composite core insert that includes features to form internal passage surfaces in the ceramic core when the composite core insert is removed wherein some of said features reside in different planes that the composite core insert cannot be molded as one piece as a result of complex internal core geometry and that comprises at least one preformed fugitive core insert and at least one in-situ-molded fugitive core insert connected to a portion of the at least one preformed fugitive core insert at an overmolded, hidden internal fused joint that is free of adhesive and that is so fused as to be sealed that the multi-wall molded ceramic core is free of hidden internal core molding flash that cannot be detected or removed as a result of the complex internal core geometry.

2. The combination of claim 1 wherein one of the at least one preformed fugitive core insert and at least one in-situ-molded fugitive core insert forms a cross-over passage in the multi-wall molded ceramic core when the fugitive composite core insert is removed.

3. The combination of claim 2 wherein the cross-over passage is formed proximate a leading edge and/or trailing edge of the multi-wall molded ceramic core.

4. The combination of claim 1 wherein one of the at least one preformed fugitive core insert and at least one in-situ-molded fugitive core insert forms a pressure-side skin core integral with the multi-wall molded ceramic core when the composite core insert is removed.

5. The combination of claim 1 wherein one of the at least one preformed fugitive core insert and at least one in-situ-molded fugitive core insert forms a suction-side skin core integral with the multi-wall molded ceramic core when the composite core insert is removed.

6. The combination of claim 1 wherein one of the at least one preformed fugitive core insert and at least one in-situ-molded fugitive core insert forms a trailing edge surface on the multi-wall molded ceramic core when the composite core insert is removed.

7. The combination of claim 1 wherein the at least one preformed fugitive core insert comprises a material selected from the group consisting of wax and plastic material.

8. The combination of claim 1 wherein the at least one in-situ-molded fugitive core insert comprises a material selected from the group consisting of wax and plastic material.

9. The combination of claim 1 wherein said at least one preformed fugitive core insert is configured to form an internal passage surface in a portion of the core that forms a portion of a leading edge of the airfoil to be cast.

10. The combination of claim 1 wherein said at least one preformed fugitive core insert is configured to form an internal passage surface in a portion of the core that forms a portion of a trailing edge of the airfoil to be cast.

11. The combination of claim 1 wherein said at least one preformed fugitive core insert is configured to form an internal passage surface in a portion of the core that forms a portion of a suction side of the airfoil to be cast.

12. The combination of claim 1 wherein said at least one preformed fugitive core insert is configured to form an internal passage surface in a portion of the core that forms a portion of a pressure side of the airfoil to be cast.

* * * * *